United States Patent [19]

Tsuge et al.

[11] Patent Number: 4,666,097
[45] Date of Patent: May 19, 1987

[54] METHOD AND APPARATUS FOR WINDING SEAT BELT THEREOF

[75] Inventors: Noboru Tsuge, Kariya; Masahiro Taguchi, Hazu; Satosi Kuwakado, Nukata; Kazutaka Kato, Okazaki, all of Japan

[73] Assignee: Nippon Soken, Inc., Nishio, Japan

[21] Appl. No.: 689,375

[22] Filed: Jan. 7, 1985

[30] Foreign Application Priority Data

Jan. 13, 1984 [JP] Japan ................... 59-003554

[51] Int. Cl.$^4$ ............................................. B60R 22/34
[52] U.S. Cl. ................................ 242/55; 242/107.4 R; 280/807; 180/268
[58] Field of Search .............. 242/107, 107.4 R–E, 242/55; 280/801, 802, 803, 806–808; 297/475–477; 180/268, 269, 270

[56] References Cited

U.S. PATENT DOCUMENTS

| | | | |
|---|---|---|---|
| 3,182,923 | 5/1965 | Botar | 242/55 |
| 3,986,093 | 10/1976 | Wakamatsu et al. | 280/802 X |
| 4,478,433 | 10/1984 | Taguchi et al. | 242/107 X |
| 4,489,804 | 12/1984 | Kamijo | 242/107 X |
| 4,511,097 | 4/1985 | Tsube et al. | 242/107.4 R X |

FOREIGN PATENT DOCUMENTS

2914235 10/1979 Fed. Rep. of Germany ... 242/107.4 R
59-227540 12/1984 Japan .

Primary Examiner—John M. Jillions
Attorney, Agent, or Firm—Cushman, Darby & Cushman

[57] ABSTRACT

A seat belt winding apparatus with a rotation detection unit, for detecting a rotation of a belt winder shaft, and a driving unit, controlled by a detection signal from the rotation detection unit so as to apply a winding force to the belt winder shaft.

When the seat belt is pulled by a passenger and a buckle is coupled with a tongue, the driving unit is controlled so that a rotational position of the belt winder shaft in a winding termination state is stored in a storage unit as a reference rotational position, thus establishing a correspondence between a reference rotational position and a count in the storage unit.

In the belt fastened state, when the rotational position of the belt winder shaft is shifted from the reference rotational position, the shifted rotational position of the belt winder shaft is compared with the reference rotational position. The belt winder shaft is driven by the driving unit in accordance with the comparison result so as to return the belt winder shaft to the reference rotational position in the belt fastening state. Meanwhile, when the rotational position of the belt winder shaft is shifted from the reference rotational position by the pull-out operation of the seat belt in the condition that the seat belt is not worn by the passenger and the tongue and buckle are not coupled, the winder shaft is driven only in a winding direction so as to return to a reference rotational position in the retracted state.

12 Claims, 14 Drawing Figures

4,666,097

METHOD AND APPARATUS FOR WINDING SEAT BELT THEREOF

BACKGROUND OF THE INVENTION

1. Field of the Invention

The present invention relates to a method and apparatus for winding a seat belt, particularly for winding a seat belt for protecting passengers of automobiles.

2. Description of the Related Art

In conventional seat belt winding apparatuses, tension of a power spring is continuously applied upon the seat belt. The person wearing the seat belt is uncomfortably pressed by this tension. Also, this tension makes it difficult for the person to buckle the seat belt.

SUMMARY OF THE INVENTION

It is the object of the present invention to provide an improved method for winding a seat belt and an improved apparatus thereof in which the seat belt buckling operation can be easily performed and the pressure to the person's body can be moderated.

According to an aspect of the present invention there is provided a method and apparatus for winding a seat belt by a winder shaft driven by a motor controlled by a control unit, wherein the final rotational position of the winder shaft is stored in a storage unit as the reference rotational position in the seat belt fastened state, and, when a shift from the final rotational position occurs, the winder shaft is driven by a driving unit from a shifted rotational position to the final rotational position.

According to another aspect of the present invention there is provided an apparatus for winding a seat belt including a rotation detection unit for detecting the rotation of a winder shaft for winding the seat belt; a driving unit for driving the rotation of the winder shaft; and a control unit for receiving the signal from the rotation detection unit and producing a driving signal to be supplied to the driving unit. The control by the control unit is such that the final rotational position of the winder shaft is stored as the reference rotational position in the seat belt fastened state in a storing portion of the control unit when coupling between a tongue and a buckle is carried out upon fastening of the seat belt by the passengers (including driver). The reference rotational position corresponds to the counts of a counting portion of the control unit. The shifted rotational position is compared with the reference rotational position in the seat belt fastened state when the rotational position of the winder shaft is shifted during the use of the seat belt by the passengers. A driving signal is produced based on the result of the comparison to drive the driving unit to restore the final rotational position. The original rotational position of the winder shaft is stored as the reference rotational position in the complete seat belt wound state when the seat belt is completely wound by the winder shaft on the condition that the seat belt is not fastened by the driver and the tongue and the buckle are not coupled. The shifted rotation position is compared with the reference rotational position in the complete seat belt wound state when the rotational position of the winder shaft is shifted by the seat belt being pulled out. A driving signal is produced based on the result of the comparison to drive the driving unit to restore the original rotational position.

BRIEF DESCRIPTION OF THE DRAWINGS

FIG. 7 is a view showing how the circuits of FIGS. 7A and 7B are connected;

FIG. 9 is a view showing how the parts of the flow chart of FIGS. 9A and 9B are connected;

FIG. 10 is a view showing how the parts of the control device of FIGS. 10A and 10B are connected

DESCRIPTION OF THE PREFERRED EMBODIMENTS

Figure 1:
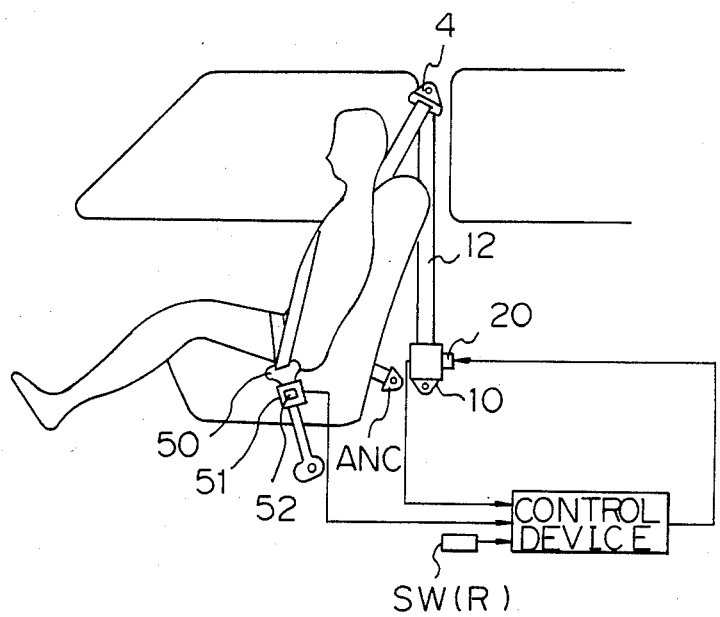
FIG. 1 is a view of a seat belt winding apparatus according to an embodiment of the present invention.
Figure 5:
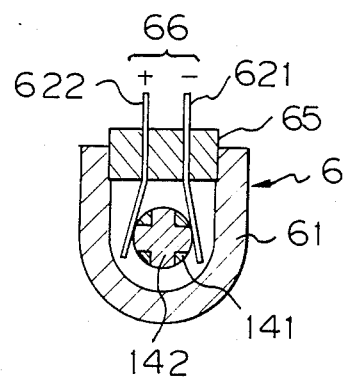
FIGS. 5 and 6 are cross-sectional views of other examples of the pull-out sensor.
Figure 6:
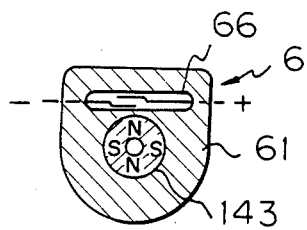
Figure 7A:
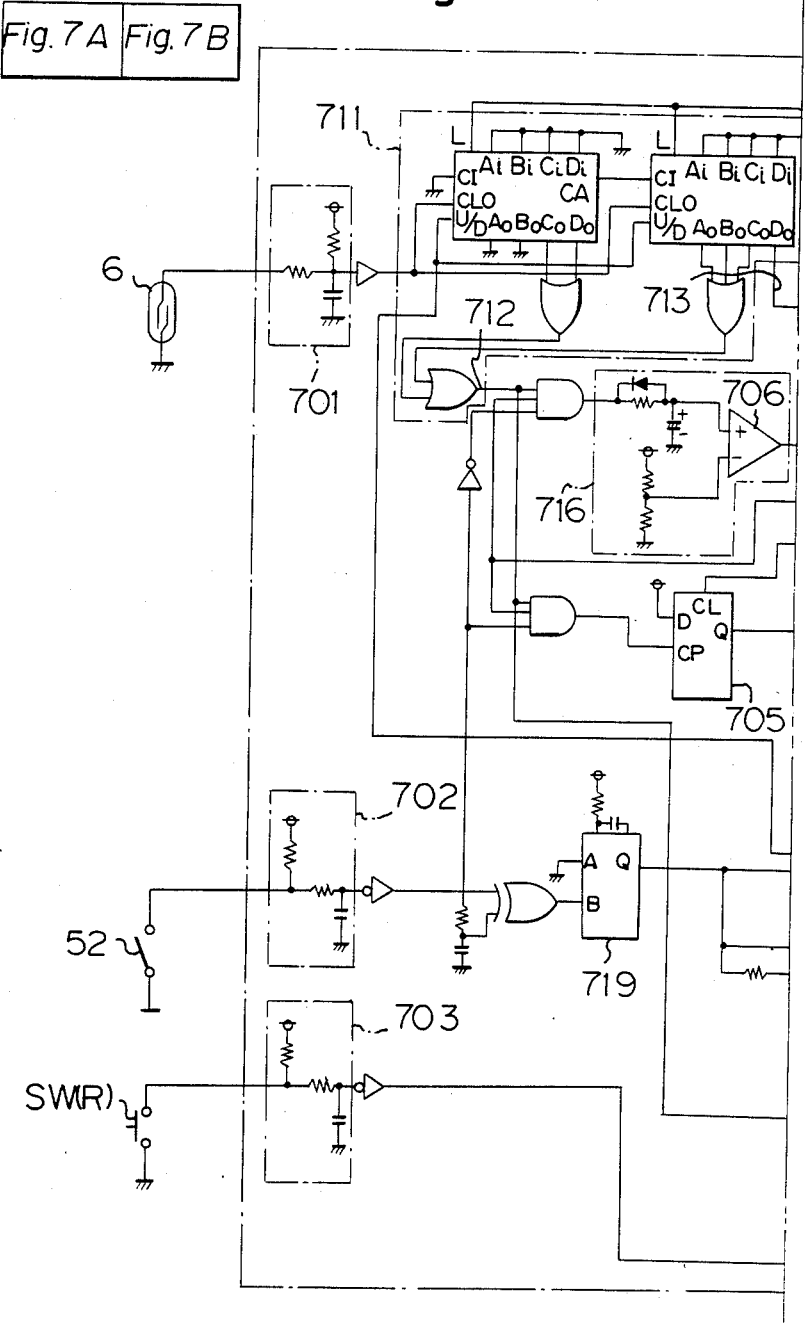
FIGS. 7A and 7B are views of a configuration of a control device of the apparatus shown in FIG. 1.
Figure 7B:
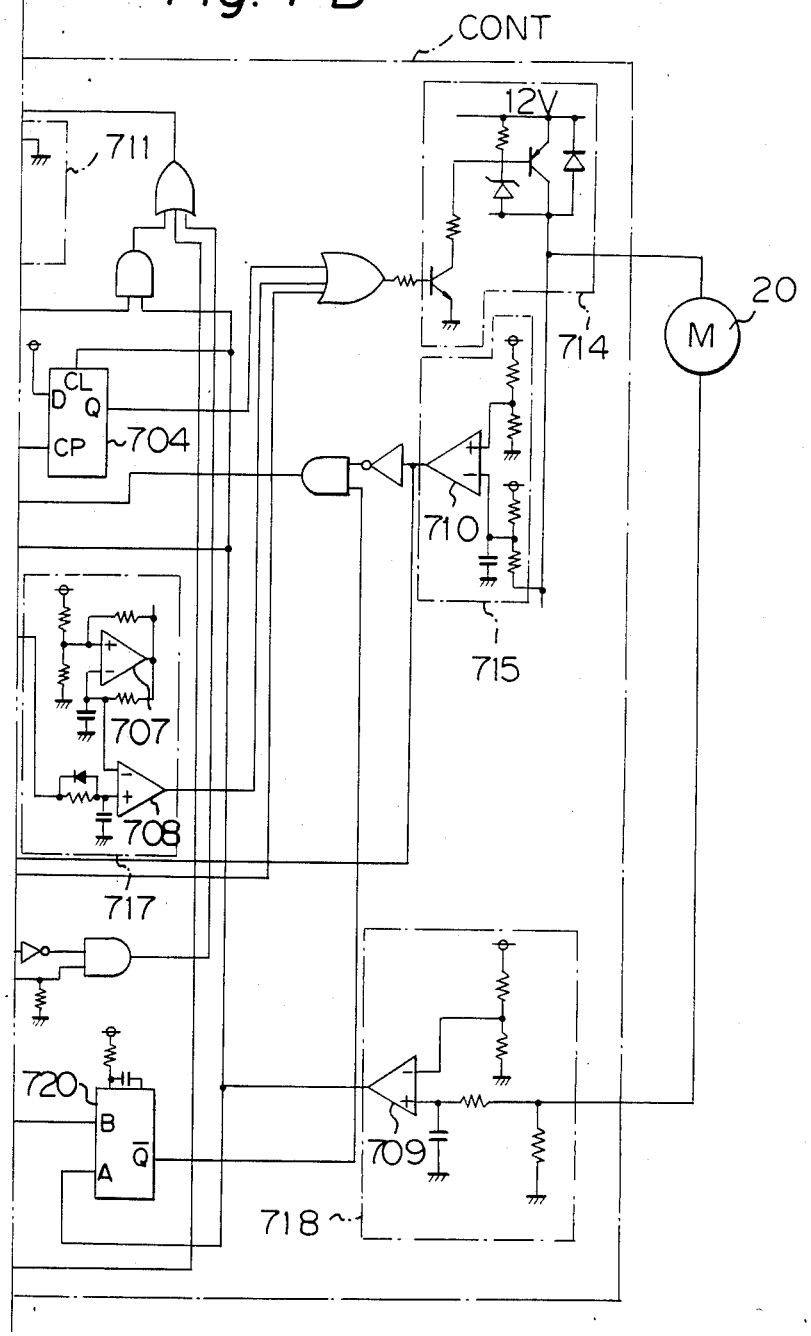

FIG. 1 shows a seat belt winding apparatus according to an embodiment of the present invention. FIGS. 2 to 6 show arrangements of a retractor section shown in FIG. 1. FIG. 7 shows a circuit configuration of a control device shown in FIG. 1. For details of the apparatus shown in FIG. 1, refer to "Seat Belt Winding Apparatus" described in Japanese Patent Application No. 58-102243 filed by the assignee of the present application.

Figure 2:
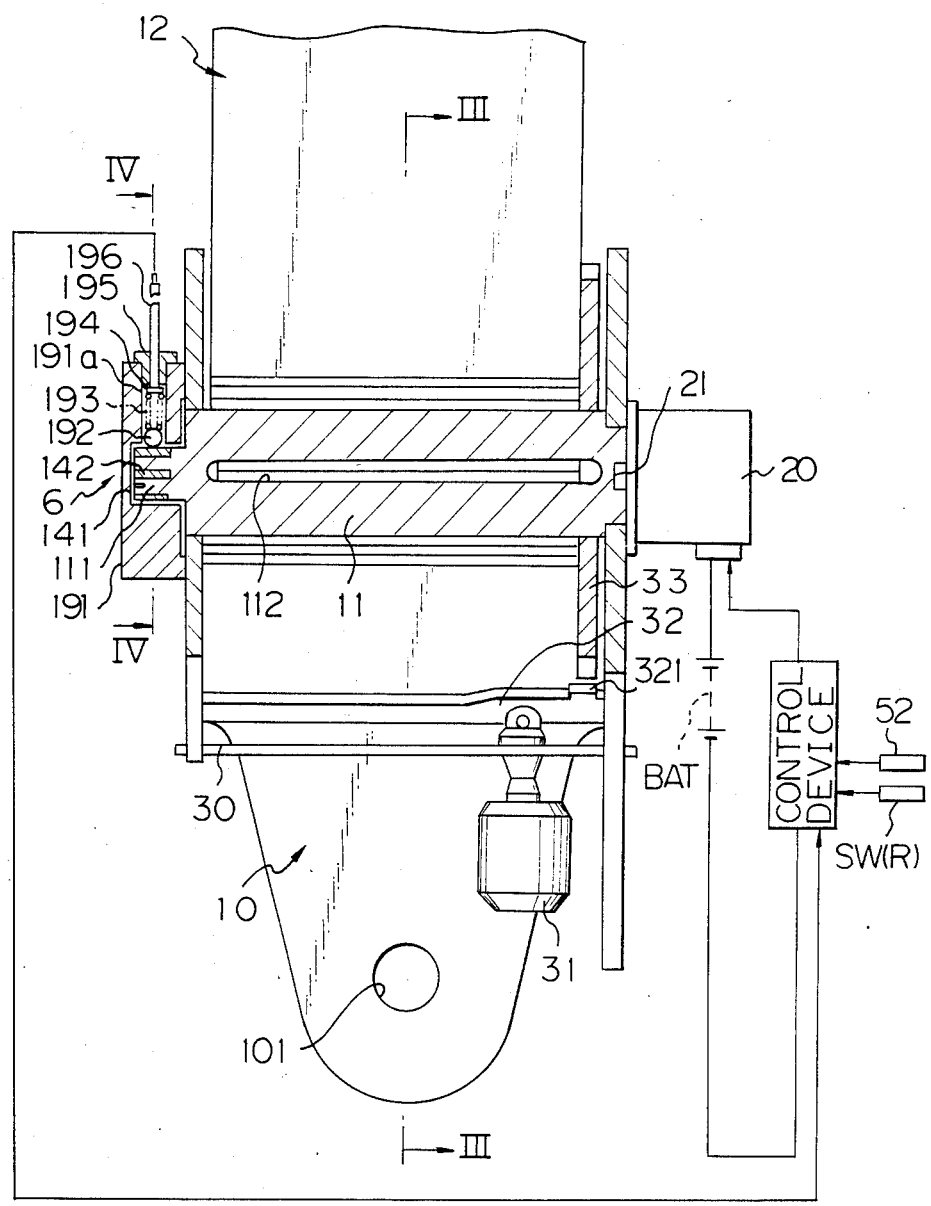
FIG. 2 shows a general arrangement of the retractor used in the apparatus shown in FIG. 1.
Figures 3, 4:
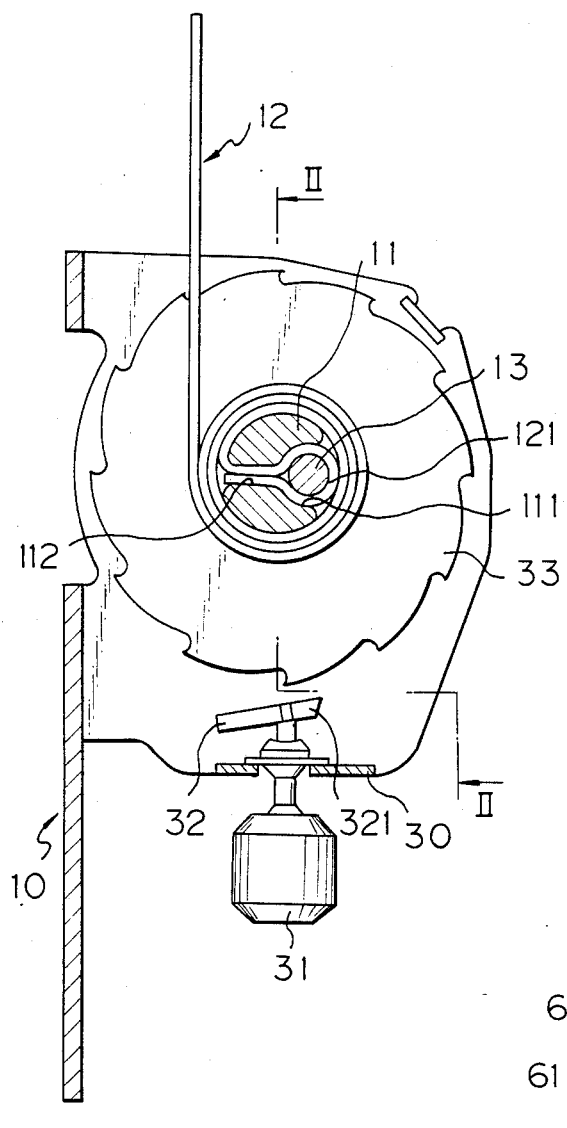
FIG. 3 is a partial cross-sectional view of the retractor taken along line III—III of FIG. 2.
FIG. 4 is a cross-sectional view of an example of the pull-out sensor taken along the line IV—IV of FIG. 2.

In the apparatus shown in FIGS. 1, 2 and 3, reference numeral 10 denotes a retractor casing. The retractor casing 10 is fixed to a chassis by a bolt (not shown) which is inserted through a hole 101. A belt winder shaft 11 having a recess 111 and a through hole 112 is rotatably held by the retractor casing 10. A loop portion 121 is formed by joining one end portion of a seat belt 12 for a three-point seat belt system. When a rod 13 is inserted in the loop portion 121 in the recess 111 of the belt winder shaft 11, the seat belt 12 cannot be removed from the belt winder shaft 11.

A motor 20 which serves as a driving means for winding the seat belt is disposed on the retractor casing 10. An output shaft 21 of the motor 20 is directly engaged and itnerlocked with the belt winder shaft 11. The belt winder shaft 11 is rotated counterclockwise in FIG. 3 by the operation of the motor 20. Meanwhile, when the seat belt 12 is pulled out from the retractor casing 10, the output shaft 21 of the motor 20 is rotated by this pulling force, and the belt winder shaft 11 is rotated clockwise in FIG. 3. The motor 20 is driven by a current supplied from a battery 9, and the supply current is controlled by a control device CONT.

A pendulum 31 is swingably held by a bracket 30 which is fixed to the retractor casing 10. When a vehicle crashes or the like, the pendulum 31 is thereby swung so as to push up a pawl 32. A projection 321 of the pawl 32 is engaged with a gear 33 which is fixed to the belt winder shaft 11, thereby locking rotation of the belt winder shaft 11.

A pull-out sensor 6, functioning as a rotation detecting means of the belt winder shaft 11, is arranged at a side of the belt winder shaft 11 opposite to the motor 20. FIG. 4 shows a first embodiment of this pull-out sensor 6 and is a sectional view taken along a line IV—IV of FIG. 2. FIGS. 5 and 6 show other embodiments of the pull-out sensor. In the pull-out sensor of FIG. 5, the rotation of the belt winder shaft is detected by the alternate electrical connection and disconnection between the lead metals 621 and 622 in association with the conductive portion 141 and the insulating portion 142 in the narrow end portion of the belt winder shaft 11. In the pull-out sensor of FIG. 6, the rotation of the belt winder shaft is detected by the alternate electrical connection and disconnection of the switch device 66 actuated by the magnet 143 in the narrow end portion of the belt winder shaft 11.

The belt winder shaft 11 is made of a conductive material. As is apparent from FIGS. 2 and 4, four insulating portions 142 are provided in a narrow end portion 111 of the belt winder shaft 11 spaced at equal intervals. Therefore, the conductive portion 141 and the insulating portions 142 alternately appear along the circumferential direction. A steel ball 192 is provided to be urged against this end portion 111 having such an arrangement. The steel ball 192 is pressed by one end of a spring 193 so as to always urge the end portion 111.

On the other hand, a spacer 194 is disposed at the other end of the spring 193, and a lead wire 196 is connected to the spacere 194. A cover 191 is provided so as to cover the end portion 111. The steel ball 192, the spring 193, and the lead wire 196 are stored in a hole 191a formed in the cover 191. A plug 195 is fitted in an opening end of the hole 191a, thereby fixing the lead wire 196. The lead wire 196 is connected to the device CONT, and a minus side thereof is grounded.

The seat belt 12 which is pulled out from the retrator casing 10 is inserted in and held by a slip joint 4 which is provided above the retractor casing 10, as shown in FIG. 1, and is connected through a tongue plate 50 to an anchor ANC which is mounted at one side of a seat. The tongue plate 50 is detachable from a buckle 51 which is mounted on the other side of the seat. The tongue plate 50 is coupled with the buckle 51, thereby completing fastening of the seat belt 12 on a passenger. A buckle sensor 52 is built in the buckle 51 and detects whether the tongue plate 50 is coupled to the buckle 51. The buckle sensor 52 constitutes a fastening sensor of the seat belt 12 for detecting its fastened state on the passenger.

FIG. 4 shows this embodiment including steel ball 62, spring 63, spacer 64, plug 65, and lead wire 66. FIGS. 5 and 6, which show alternative embodiments of this invention, also use the same numbering sequences. FIG. 5 shows an alternative embodiment in which lead wire 66 includes a first terminal 621 and a second terminal 622. As winder shaft 142 rotates, contact is alternately engaged and disengaged between terminals 621 and 622. The embodiment of FIG. 6 uses a winder shaft which includes a magnet 143 having two north poles and two south poles. Reed switch 66 is disposed near this rotating magnet, and the contacts of the reed switch are alternately caused to engage and disengage depending on the position of the magnet.

Figure 8:
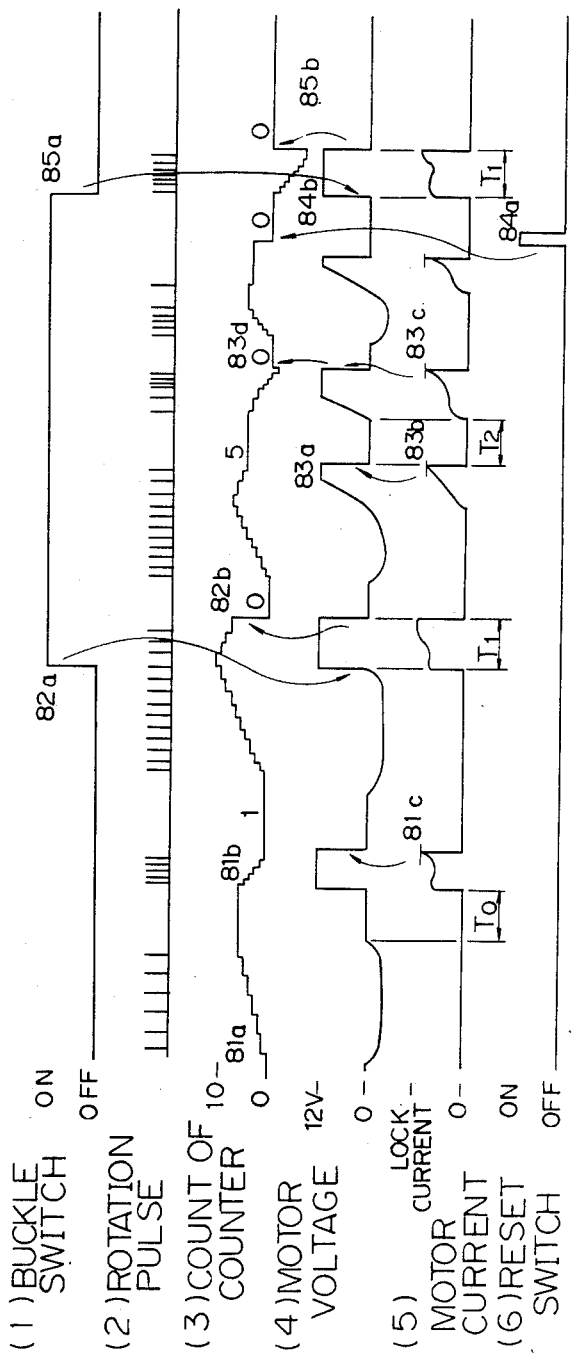
FIG. 8 is a waveform chart of waveforms of signals at portions of the circuit shown in FIG. 7.

FIG. 7 is a circuit diagram of the control device CONT as a drive controlling means, and FIG. 8 is a timing chart showing the operation thereof. In FIG. 7, reference numerals 701, 702, and 703 denote filter circuits; 704 and 705, D-flip-flops; 706, 707, 708, 709, and 710, operation amplifiers; 52, a buckle sensor; and 6, a pull-out sensor for generating a rotation signal in synchronism with a rotation of the winder shaft of the retractor.

Reference symbol SW(R) denotes a reset switch. Reference numeral 711 denotes a counter for counting a signal from a lead switch; 714, a motor driver; 715, a motor reverse rotation detector as a reverse rotation detecting means; 716, a motor driving time lag circuit; 717, a motor soft driver for gradually increasing a driving torque of the motor; 718, a motor load detector; 719, a timer for driving a motor for a predetermined interval; and 720, a timer for restarting the motor. When contacts between the buckle sensor 52 and the reset switch SW(R) are turned off, the filter circuits 702 and 703 go to HIGH level.

The motor 20 is connected to the motor driver 714. The counter 711 counts up when the seat belt 12 is pulled out, and counts down when the belt 12 is wound. In this case, the maximum count number is $2^7 = 128$. A predetermined range (count "3") of an initial position is set by ignoring the lowest 2 bits of the count of the counter 711. The sensor 6 generates pulses four times when the retracter is rotated once. The maximum rotation number of the retracter is 10, and the maximum pulse number is 40.

The operation will be described hereinafter. In the state where the buckle 51 is released (the buckle sensor 52 is turned off), when the belt 12 is pulled out, the counter 711 is set in the count-up mode in response to a signal from the motor reverse rotation detector 715. Thus, the counter 711 counts up in accordance with the number of leading ends and trailing ends of the pulse generated from the sensor 6. After the pulling-up operation is terminated, when the count of the counter 711 exceeds the predetermined range, e.g., count "4" or more, an output 712 goes to HIGH level. A predetermined time lag ($T_0$) is set by the motor driving time lag circuit 716. Thereafter, the motor 20 is driven by the motor driver 714, and the counter 711 is set in the count-down mode, thus counting down in response to the number of pulses.

At this time, when a motor load is detected by the motor load detector 718 and this load reaches a predetermined load, the motor load detector 718 generates a signal for terminating rotation of the motor 20 (at points 81a, 81b, and 81c in FIG. 8). When the count of the counter 711 falls within the predetermined range, e.g., count "0" to "3", the motor 20 is not driven.

When the driver wears the seat belt 12 and couples the tongue plate 50 to the buckle 51, the buckle sensor 52 is turned on. Then, the timer 719 for driving the motor for a predetermined time generates a signal for a predetermined interval ($T_1$), and the motor 20 is driven for the predetermined interval $T_1$. During this interval, the seat belt 12 is fastened without loosening. After the interval $T_1$ has elapsed, the counter 711 is reset to "0" in response to the trailing end of the signal from the timer 719, thereby initializing the counter for the seat belt 12 (at points 82a and 82b in FIG. 8).

In the state where the buckle 51 is coupled with the tongue plate 50 (the buckle sensor 52 is kept on), when the seat belt 12 is pulled out, the motor soft driver 717 generates a signal with a duty cycle gradually increasing at a predetermined frequency. In response to this signal, the motor driver 714 drives the motor 20 so as to gradually tighten the seat belt 12. Thereafter, when the motor load reaches the predetermined load, the motor load detector 718 terminates the operation of the motor 20.

In this case, when the count of the counter 711 exceeds the predetermined range (e.g., count "4" or more), the output 712 is kept at HIGH level, and the timer 720 for restarting the motor sets a time lag of $T_2$. Thereafter, the motor driver 717 restarts the motor 20. This operation is continued until the count of the counter 711 becomes "3" or less. After the winding operation is completed, when the count of the counter 711 becomes negative, the most significant bit (MSB) of the counter 711 goes HIGH. Therefore, an output 713 goes HIGH. Thus, the initial position is reset and the count of the counter 711 is reset to "0" (at points 83a, 83b, 83c, and 83d in FIG. 8).

When the initial position of the seat belt 12 is shifted, for example, the position of a seat back is shifted forward in the buckle coupling state, the reset switch SW(R) is manually turned on and the count of the counter 711 is reset to "0" again (at points 84a and 84b in FIG. 8).

When the buckle 51 is released, the buckle sensor 52 is turned off and the timer 719 generates a signal for the predetermined interval ($T_1$), thereby driving the motor 20 for the interval $T_1$. After the interval $T_1$ has elapsed, the counter 711 is reset to "0" in response to the trailing end of the signal from the timer 719 (at points 84a and 84b in FIG. 8).

Figure 9A:
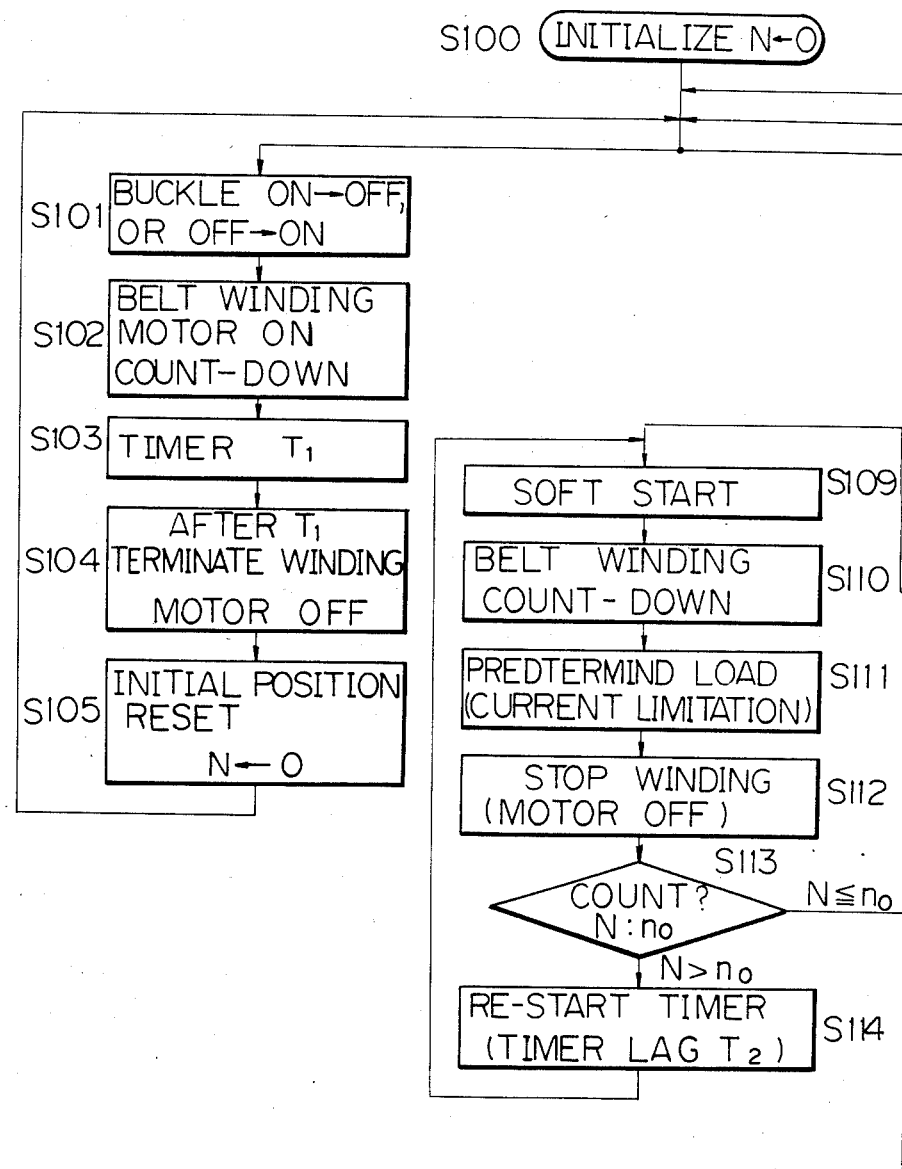
FIGS. 9A and 9B are a flow chart of an operation of the circuit shown in FIG. 7.
Figure 9B:
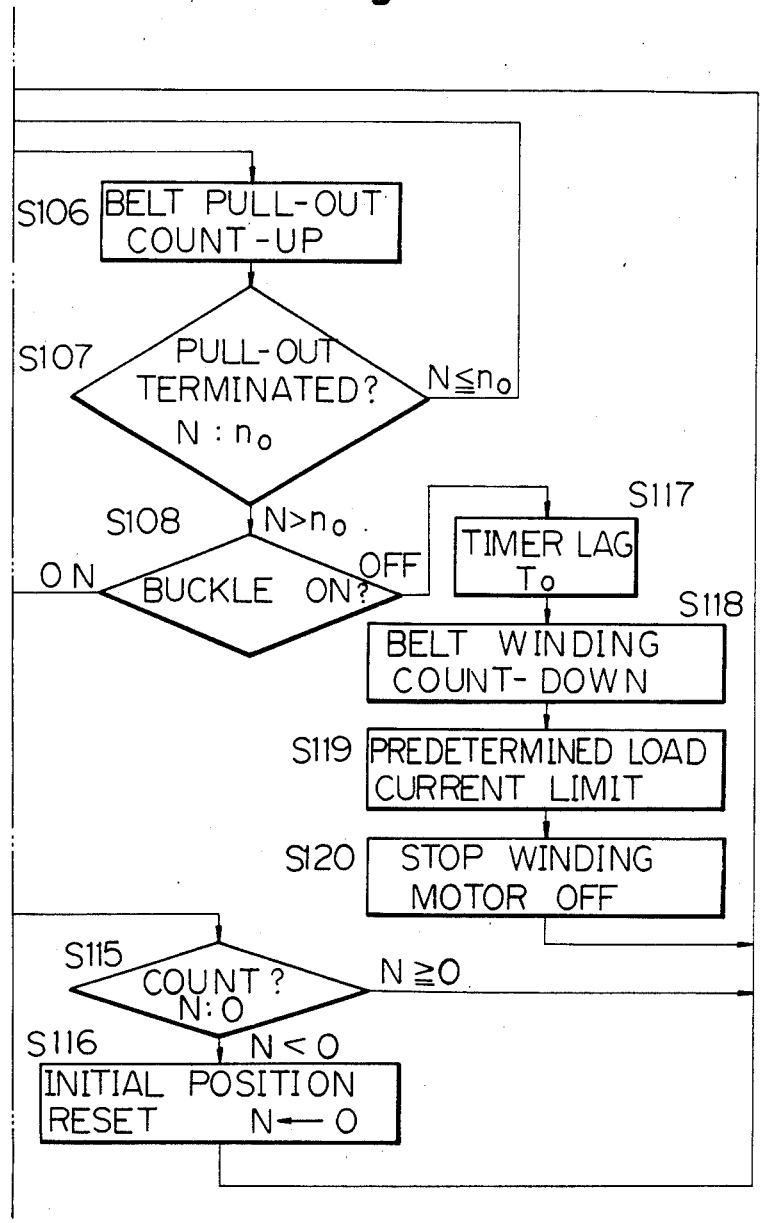

FIG. 9 shows a flow chart of the operation of the control device of FIG. 7. Respective steps in the flow chart of FIG. 9 are as follows.

(i) When the seat belt is wound by the retractor, the count of the counter is set to "0" (step S100).

(ii) When the buckle is coupled or released, the belt is wound and the motor is stopped after the interval $T_1$. After stopping the motor, the count of the counter is reset to "0" (steps S101 to 105).

(iii) When the belt is pulled out, the counter counts up. After the pull-out operation, when a count "N" is less than a dead zone count "$n_0$", the belt is left unwound (steps S106 and S107).

(iv) When the count "N" is larger than the count "$n_0$", the subsequent winding operation of the belt depends upon whether the buckle is coupled or uncoupled (step S108).

(v) When the buckle is coupled, the belt is wound in the soft winding mode. In this case, the counter counts down (steps S109 and S110).

(vi) The motor load detector detects a current flowing in the motor. In this case, a current is increased in accordance with an increase in a motor load. When the current reaches a predetermined current, the motor load detector determines that the motor load has reached the predetermined load, thus terminating the winding operation (steps S111 and S112).

(vii) When the count in the winding termination state is larger than the dead zone count "$n_0$" (step S113), the belt is wound in the soft winding mode after the interval $T_2$ (steps S114 to S109). These operations are repeated until the count in the winding termination state becomes smaller than the count "$n_0$" (steps S109 to S114).

(viii) When the count in the winding termination state becomes smaller than the count "$n_0$" and the count becomes negative, the count of the counter is reset to "0" (steps S116). When the count is between the count "0" and "$n_0$", the count of the counter is left unchanged.

(ix) The winding operation in the buckle uncoupled state starts after the time lag $T_0$. Also, in this case, the counter counts down. When the motor load reaches the predetermined load, the winding operation is terminated (steps S117 to S120).

Figure 10A:
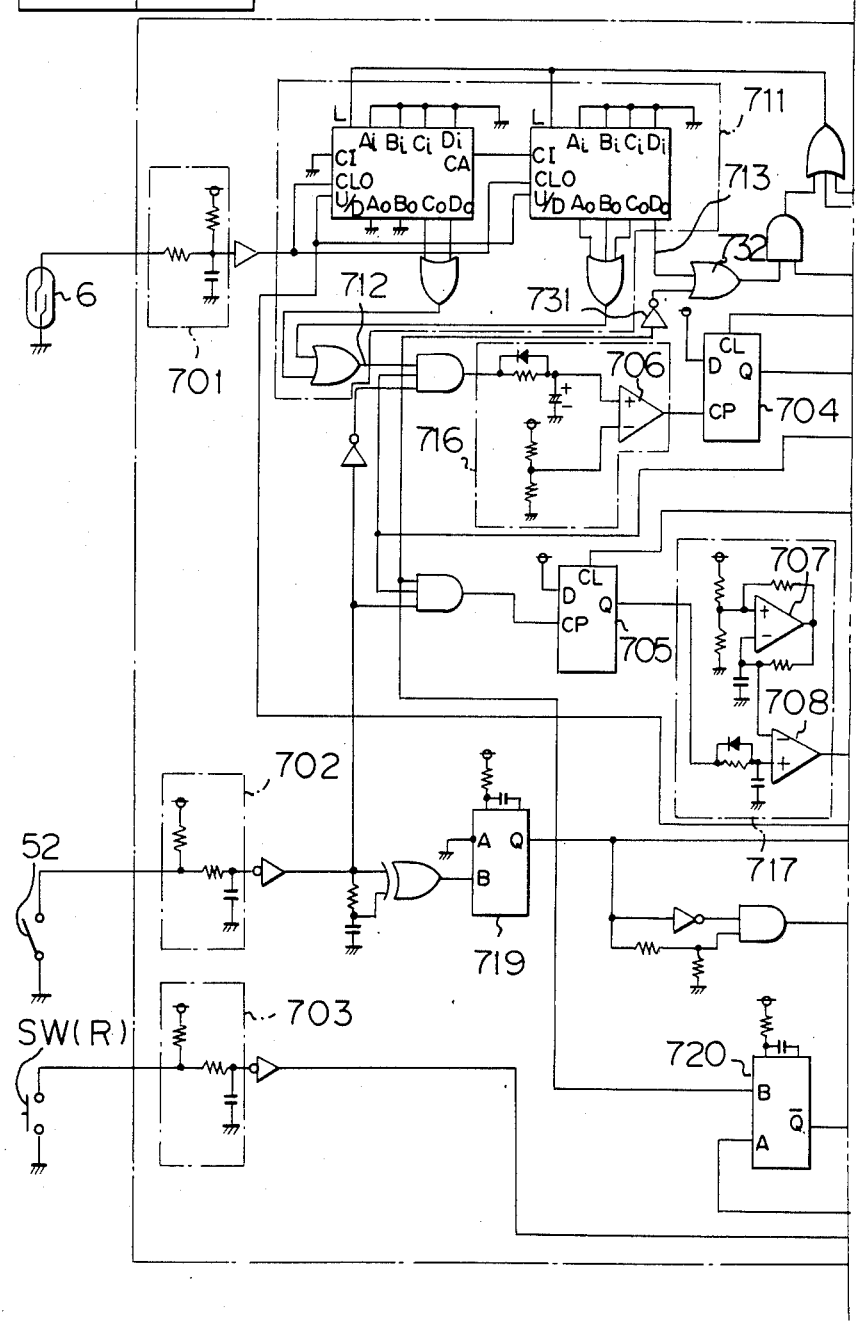
FIGS. 10A and 10B are views of a control device according to another embodiment of the present invention.
Figure 10B:
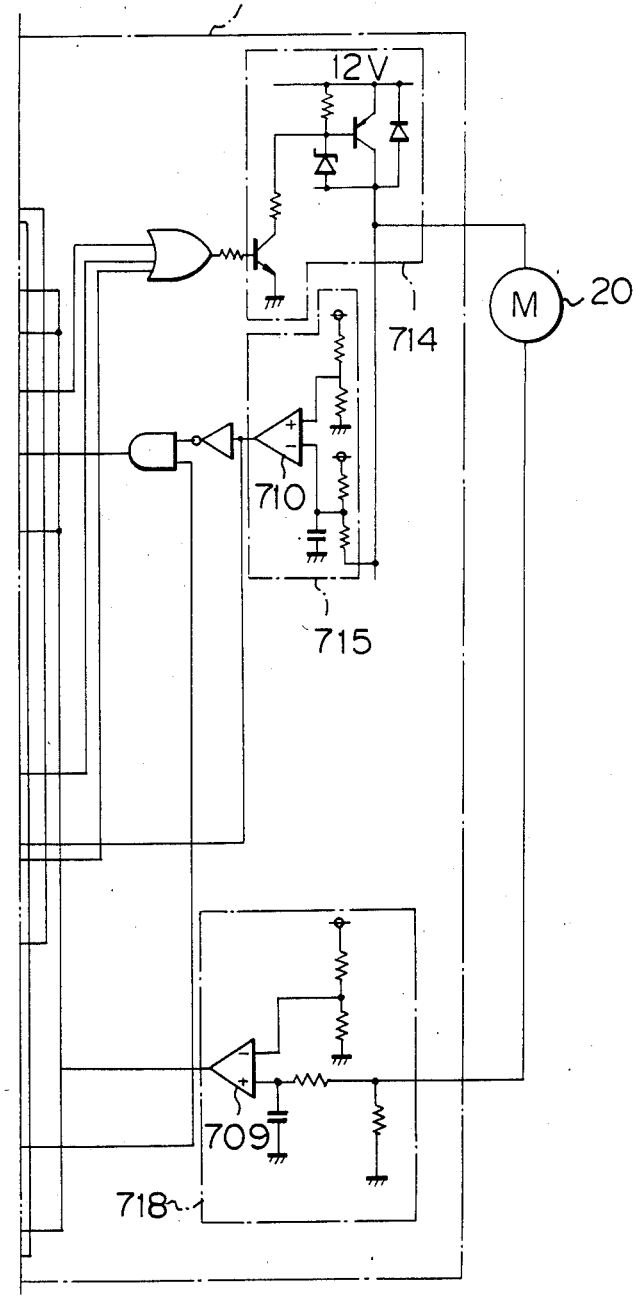
Figure 11:
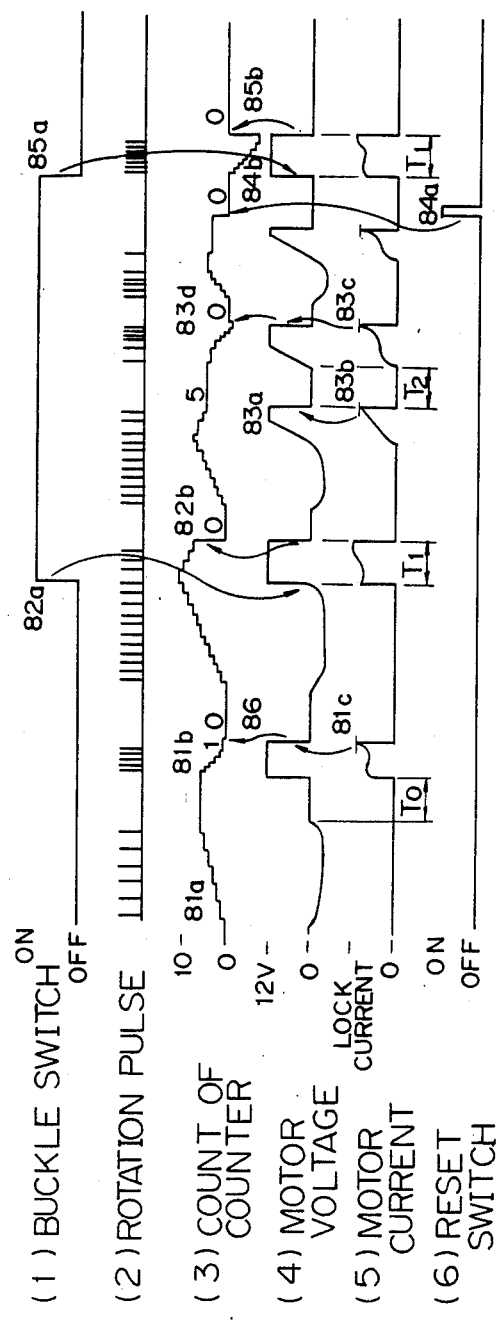
FIG. 11 is a waveform chart of waveforms of signals at portions of the circuit shown in FIG. 10.

FIG. 10 shows another embodiment of a control device. FIG. 11 shows waveforms of signals at portions of the circuit shown in FIG. 10.

In the circuit of FIG. 10, in the case where the winding operation is terminated by the motor load detector 718 during the winding operation by the motor 20, when the count of the counter 711 falls within the predetermined range between the counts "0" to "3" the count of the counter 711 is reset to "0" (at a point 86 in FIG. 11). The circuit shown in FIG. 10 is substantially the same as that of FIG. 7 except for a NOT gate 731 and an OR gate 732.

We claim:

1. An apparatus for winding a seat belt having a tongue and a buckle which are connected to fasten the seat belt comprising:
    a winder shaft around which the seat belt is adapted to be wound;
    rotation detection means for detecting a rotation of said winder shaft and producing a signal indicative thereof;
    control means for receiving said indicative signal from said rotation detection means and producing a driving signal;
    driving means for driving said winder shaft based on said driving signal;
    wherein said control means includes:
    means for storing a final rotational position of said winder shaft in a seat belt fastened state as a first reference rotational position, and for storing an original rotational position of said winder shaft as a second reference rotational position in a complete seat belt wound state in which the seat belt is completely wound by said winder shaft with the tongue and the buckle not being coupled and the seat belt not being fastened;
    means responsive to said rotation detecting means for determining a shifted rotational position of the seat belt;
    means for comparing said shifted rotational position with said first reference rotational position in said seat belt fastened state when said rotational position of said winder shaft is shifted during the use of the seat belt, and for comparing a shifted rotational position with the second reference rotational position in said complete seat belt wound state when said rotational position of said winder shaft is shifted by the seat belt being pulled out; and
    driving signal production means for producing a driving signal based on the result of one of said comparings performed by said comparing means to drive said driving means to restore said predetermined final rotational position, and for producing a driving signal based on the result of said comparing to drive said driving means to restore said original rotational position.

2. An apparatus as in claim 1 further comprising means for detecting a load on said driving means.

3. An apparatus according to claim 2, wherein an electric motor is used as said driving means, and said control means further includes means for terminating the driving by said electric motor when the current of said electric motor reaches a predetermined current corresponding to a predetermined load, and for restarting the driving by said electric motor when the restoration of the reference rotational position in the seat belt fastened state is not achieved, said restarting occurring after a predetermined delay time, a driving in only a winding direction by said driving means being carried out to restore the reference rotational position to the seat belt fastened state.

4. An apparatus according to claim 3 further comprising means for adopting a new reference position, a new reference position being adopted when the driving of said driving means is terminated upon attainment of a predetermined load of said driving means and the rotational position at said termination of the driving exceeds a predetermined reference position in the winding direction.

5. An apparatus according to claim 1, wherein the storage of said reference rotational position in the seat belt fastened state or said reference rotational position in the complete seat belt wound state is the storage of a predetermined range of counts 0 to n.

6. An apparatus according to claim 5 further comprising means for detecting a load on said driving means and means for adopting a new reference position, such a new position being adopted when said driving of said driving means is terminated upon attainment of a predetermined load of said driving means, and the rotational position at said termination of the driving is within said predetermined range of counts.

7. An apparatus according to claim 6, wherein an electric motor is used as said driving means, means for detecting the current of said electric motor is used as said means for detecting a load on said driving means, and said attainment of a predetermined load of said driving means is represented by the attainment of a predetermined current of said electric motor.

8. An apparatus as in claim 1, wherein said rotation detecting means is also for producing a count signal each time said winder shaft rotates by a predetermined amount; and wherein said control means further includes means for counting said count signal and for determining a rotational position based on said count signal.

9. An apparatus as in claim 1 further comprising means for resetting said reference rotational positions.

10. An apparatus as in claim 1, wherein said driving signal production means produces said driving signals after a predetermined time lag.

11. An apparatus for keeping a seat belt tight comprising:
a winding shaft around which seat belt is wound, said winding shaft being capable of rotation to wind said seat belt in a first direction to make the seat belt tighter, and in a second direction to make the seat belt looser;
means for detecting an angular position of said winding shaft, including:
(a) means for detecting rotation of said winding shaft and producing a count signal, each count signal being indicative of a predetermined amount of rotation of said winding shaft;
(b) means for counting said count signals; and
(c) means for determining an angular position shift of said winding shaft;
means for rotating said winding shaft;
means for detecting an amount of torque produced by said rotating means during said rotating;
controlling means for terminating the operation of said rotating means when said torque detected exceeds a predetermined amount, including:
(a) means for initiating said rotating means when said angular position shift is greater than a predetermined amount.
(b) means for resetting said counting means; and
(c) lag means for delaying the initiation of said rotating means when said angular position shift of said predetermined amount is detected, said lag being of a predetermined time period;
wherein said apparatus further comprises buckle detecting means for detecting a buckling of said seat belt, said counting means being reset as a response to a detection of said buckling, said controlling means further includes:
(d) means for driving said rotating means at variable duty cycle which increases at a predetermined rate in response to a detection of said seat belt being buckled.

12. An apparatus for keeping a seat belt tight comprising:
a winding shaft around which said seat belt is wound, said winding shaft being capable of rotation to wind said seat belt in a first direction to make the seat belt tighter, and in a second direction to make the seat belt looser;
means for detecting an angular position of said winding shaft;
means for rotating said winding shaft;
means for detecting an amount of torque produced by said rotating means during said rotating;
controlling means for terminating the operation of said rotating means when said torque detected exceeds a predetermined amount; and
buckle detecting means for detecting the buckling of said seat belt;
wherein said controlling means further includes means for driving said rotating means at a variable duty cycle which increases at a predetermined rate in response to a detection of said seat belt being buckled.

* * * * *